US009614438B2

(12) United States Patent
Davis

(10) Patent No.: US 9,614,438 B2
(45) Date of Patent: Apr. 4, 2017

(54) ADJUSTING FEEDBACK VOLTAGE RIPPLE AMPLITUDE TO CONTROL POWER SUPPLY SWITCHING FREQUENCY

(71) Applicant: SEMICONDUCTOR COMPONENTS INDUSTRIES, LLC, Phoenix, AZ (US)

(72) Inventor: Robert Davis, Cranston, RI (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 14/699,042

(22) Filed: Apr. 29, 2015

(65) Prior Publication Data

US 2016/0322896 A1    Nov. 3, 2016

(51) Int. Cl.
*H02M 3/156*   (2006.01)
*H02M 1/32*    (2007.01)
*H02M 1/15*    (2006.01)

(52) U.S. Cl.
CPC ............ *H02M 3/156* (2013.01); *H02M 1/32* (2013.01); *H02M 1/15* (2013.01)

(58) Field of Classification Search
CPC . H02M 2001/0025; H02M 2001/0016; H02M 3/156; H02M 3/158
See application file for complete search history.

(56) References Cited

U.S. PATENT DOCUMENTS

| 4,857,778 A * | 8/1989 | Hague ................ H03H 11/1291 327/434 |
| 6,348,780 B1 | 2/2002 | Grant |
| 2008/0067993 A1* | 3/2008 | Coleman ................. H02M 1/08 323/282 |
| 2008/0129264 A1* | 6/2008 | Moussaoui ........... H02M 3/156 323/283 |
| 2012/0217941 A1* | 8/2012 | Chen ..................... H02M 3/156 323/271 |
| 2015/0180325 A1* | 6/2015 | Liang ................ H02M 3/33546 363/21.09 |

* cited by examiner

*Primary Examiner* — Jessica Han
*Assistant Examiner* — Bart Iliya
(74) *Attorney, Agent, or Firm* — Conley Rose, P.C.

(57) ABSTRACT

A method, in some embodiments, comprises: receiving a feedback voltage signal generated by a switch-mode power supply; generating an error signal based on a difference between a switching frequency of the switch-mode power supply and a target frequency; and using the error signal to adjust a ripple amplitude of the feedback voltage signal to control said switching frequency in the switch-mode power supply.

20 Claims, 3 Drawing Sheets

ADJUSTING FEEDBACK VOLTAGE RIPPLE AMPLITUDE TO CONTROL POWER SUPPLY SWITCHING FREQUENCY

BACKGROUND

A direct current (DC)-DC converter is typically used to step down a power supply voltage to meet the needs of a particular circuit. In many instances, such circuits have variable loads—for example, in DC motors, which are found in innumerable types of electronic products, from medical equipment to automobiles. To conserve power while maintaining the proper voltage supply to the variable load, DC-DC converters often employ pulse width modulation (PWM), in which an input voltage that is rapidly switched on and off is applied to an output filter to regulate the voltage and current supplied to the load in an efficient manner (called "switch-mode power supplies"). The switching action is often performed by a hysteretic comparator, which uses a feedback loop from the power supply output to determine the proper switching duty cycle required to regulate the load.

The output voltage of the power supply, however, typically contains some degree of ripple. The hysteretic comparator's hysteresis trip points may be set to account for this ripple so that the hysteretic comparator changes output state at a desired frequency, resulting in a desired power supply switching frequency. However, the amplitude of the ripple in the output voltage can dynamically increase or decrease, thus causing the hysteretic comparator to change output state too frequently or infrequently. This, in turn, results in an inappropriate power supply switching frequency. Accordingly, a technique for reliably controlling a switch-mode power supply's switching frequency—even in the face of ripple amplitude variations—is desired.

SUMMARY

At least some embodiments are directed to a method that comprises: receiving a feedback voltage signal generated by a switch-mode power supply; generating an error signal based on a difference between a switching frequency of the switch-mode power supply and a target frequency; and using the error signal to adjust a ripple amplitude of the feedback voltage signal to control said switching frequency in the switch-mode power supply. These embodiments may be supplemented in various ways, including with any or all of the following concepts, in any order and in any combination: wherein the switch-mode power supply comprises a direct current (DC)-DC converter selected from the group consisting of a buck converter, a boost converter, a buck-boost converter, an inverting converter, a flyback converter and a single-ended primary-inductor converter (SEPIC); wherein adjusting said ripple amplitude comprises providing the error signal to an active filter; further comprising using the active filter to maintain said ripple amplitude; wherein the active filter is a high-pass filter or a band-pass filter; wherein the active filter includes multiple capacitors and a transistor in series with one of said multiple capacitors; wherein controlling said switching frequency comprises providing the feedback voltage signal to a hysteretic comparator; further comprising maintaining a fixed hysteresis in the hysteretic comparator.

At least some embodiments are directed to a system, comprising: an amplifier that receives a feedback voltage signal generated by a switch-mode power supply; a frequency detector, coupled to the amplifier, to produce an error signal based on a comparison of a switching frequency of the switch-mode power supply and a target frequency; and a hysteretic comparator, coupled to the amplifier, to control said switching frequency, wherein the amplifier uses the error signal to adjust an amplitude of a ripple in the feedback voltage signal, and wherein the hysteretic comparator controls said switching frequency using the feedback voltage signal. These embodiments may be supplemented in various ways, including with any or all of the following concepts, in any order and in any combination: wherein the hysteretic comparator receives the feedback voltage signal from the amplifier; wherein the amplifier is an active filter that comprises a high-pass filter or a band-pass filter; wherein the amplifier uses the error signal to maintain said amplitude of the ripple.

At least some embodiments are directed to a system, comprising: a direct current (DC)-DC converter that produces an output voltage signal having a ripple and a feedback voltage signal having said ripple; a frequency detector, coupled to the converter, that compares a switching frequency of the converter to a target frequency and produces an error signal based on said comparison; an amplifier, coupled to the converter and the frequency detector, that adjusts an amplitude of said ripple in the feedback voltage signal based on the error signal; and a hysteretic comparator, coupled to the amplifier, that controls the switching frequency of the converter using said feedback voltage signal. These embodiments may be supplemented in various ways, including with any or all of the following concepts, in any order and in any combination: wherein the hysteretic comparator receives the feedback voltage signal from an output of the amplifier; wherein the amplifier comprises an active filter that is either a high pass filter or a band-pass filter; wherein the converter is a buck converter, a boost converter, a buck-boost converter, an inverting converter, a flyback converter, or a single-ended primary-inductor converter (SEPIC); wherein the hysteretic comparator uses a fixed hysteresis; wherein the frequency detector comprises a phase-locked loop (PLL); further comprising a voltage divider coupled to the amplifier, wherein a portion of the feedback voltage signal passing through the voltage divider has a DC component and an alternating current (AC) component, and wherein another portion of the feedback voltage signal passing through the amplifier has only an AC component; wherein the amplifier obtains said feedback voltage signal from a portion of the DC-DC converter other than a node at which the output voltage signal is produced.

BRIEF DESCRIPTION OF THE DRAWINGS

There are disclosed in the drawings and in the following description techniques for dynamically adjusting the feedback voltage ripple amplitude to control power supply switching frequency. In the drawings.

Figure 1:
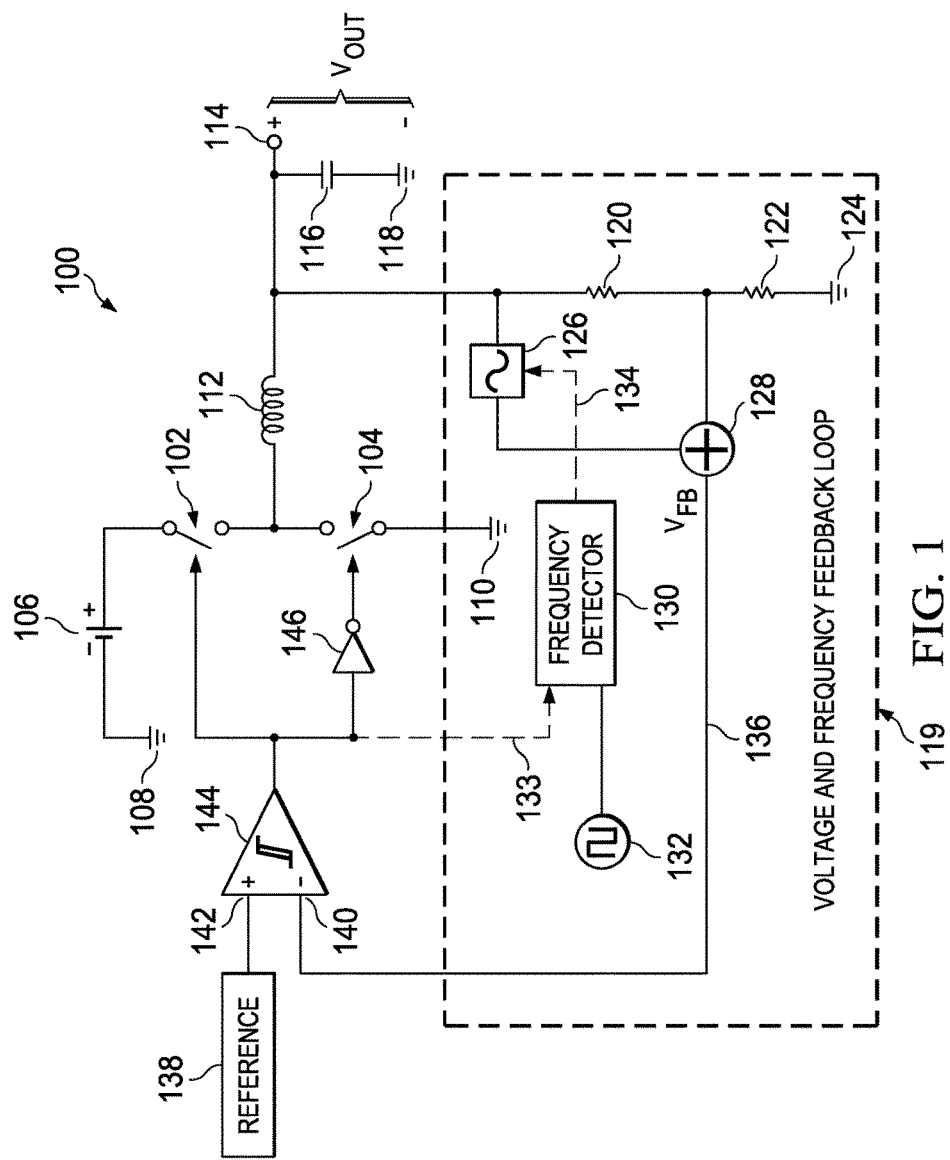
FIG. 1 is a circuit schematic diagram of an illustrative switch-mode power supply implementing at least some of the techniques described herein.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein is a technique for reliably maintaining a desired switching frequency in a switch-mode power supply. The technique is particularly useful in switch-mode power supplies that tend to experience unstable switching frequencies, such as those that receive variable input voltages. The technique includes using a frequency detector to generate an error signal that reflects the difference between an actual switching frequency of the switch-mode power supply and a target frequency. An amplifier, such as an active filter, uses the error signal to increase or decrease the amplitude of the ripple in a feedback voltage signal provided by the switch-mode power supply. The amplifier adjusts the ripple amplitude so that a hysteretic comparator to which the amplifier provides the feedback voltage signal switches output state more or less frequently than its current output state switching frequency. For example, if the amplifier increases the amplitude of the ripple, the ripple will exceed the hysteresis of the hysteretic comparator more often, resulting in more frequent output state changes by the hysteretic comparator. This, in turn, causes the switch-mode power supply to switch at a greater frequency. Conversely, if the amplifier decreases the amplitude of the ripple, the ripple will exceed the hysteresis of the hysteretic comparator less often, resulting in less frequent output state changes by the hysteretic comparator. This, in turn, causes the switch-mode power supply to switch at a lesser frequency.

By dynamically responding to ripple amplitude changes caused by instability in the system, the amplifier is able to maintain a substantially constant ripple amplitude (e.g., within 5%) in the feedback voltage signal and, therefore, a substantially constant power supply switching frequency. Thus, for instance, if a large input voltage swing at the input to the switch-mode power supply causes an increase in ripple amplitude and thus an increase in switching frequency, the frequency detector will determine that the actual switching frequency of the power supply has exceeded a target frequency and will issue an error signal to the amplifier. The amplifier, in turn, will tune the ripple amplitude downward until the actual power supply switching frequency returns to the target frequency and the difference between the target frequency and the actual switching frequency is resolved.

FIG. 1 is a circuit schematic diagram of an illustrative switch-mode power supply 100 implementing at least some of the techniques described herein. The power supply 100 may be, for instance, a DC-DC converter, such as a buck converter, a boost converter, a buck-boost converter, an inverting converter, a flyback converter or a single-ended primary-inductor converter (SEPIC). The power supply 100 includes switches 102, 104 (e.g., transistor switches); an input voltage source 106 (e.g., a car battery, mains power) coupled to ground 108; ground 110 that couples to the switch 104; an inductor 112; an output voltage node 114 across which an output voltage $V_{OUT}$ is provided; a capacitor 116 coupled to ground 118; a voltage divider circuit including impedances 120, 122; a ground 124 coupled to the impedance 122; an amplifier 126 coupled to the node 114; a summing amplifier 128 coupled to the amplifier 126; a phase and frequency detector 130 (e.g., phase-locked loop (PLL)); a target frequency signal generator 132 (e.g., oscillator) coupled to the detector 130; a switching frequency signal 133 between the detector 130 and the switch-mode power supply; an error signal 134 between the detector 130 and the amplifier 126; a feedback voltage signal $V_{FB}$ 136 provided from the summing amplifier 128 to the inverting input 140 of a hysteretic comparator 144; and a reference signal 138 coupled to the non-inverting input 142 of the hysteretic comparator 144. The symbol $V_{FB}$ and numeral 136 are used to distinguish the feedback voltage signal as provided to the hysteretic comparator 144 from the feedback voltage signal as provided to the voltage divider circuit and the amplifier 126; however, the term "feedback voltage signal" generally refers to the signal that passes through the voltage and frequency feedback loop 119, irrespective of any modifications to that signal. The hysteretic comparator 144 drives the switches 102, 104, and coupled between the comparator 144 and the switch 104 is an inverter 146. At least the amplifier 126, impedances 120, 122, the ground 124, summing amplifier 128, frequency detector 130, target frequency signal generator 132, and signals 133, 134, 136 form a voltage and frequency feedback loop 119. The specifications for the inductor 112, capacitor 116, impedances 120 and 122, and other such circuit components may be selected as necessary and desired by a skilled circuit engineer for the particular application in which the power supply is being implemented. The scope of disclosure is not limited to the specific circuit shown in FIG. 1. On the contrary, any circuit that achieves switching frequency stabilization in a switch-mode power supply using the techniques disclosed herein falls within the scope of the disclosure. For example, in some embodiments, a sense resistor may be coupled between the inductor 112 and the node 114, with the voltage divider circuit coupling to one side of the sense resistor and the amplifier 126 coupling to the other side of the sense resistor.

In operation, the voltage source 106 provides a voltage signal to the switch 102, while ground 110 couples to the switch 104. The hysteretic comparator 144 causes the switches 102, 104 to open and close. For example, when the hysteretic comparator 144 outputs a HIGH signal, the switch 102 closes and the switch 104 opens (due to the inverter 146). Thus, a HIGH signal is output to the inductor 112 due to the voltage source 106. Conversely, when the hysteretic comparator 144 outputs a LOW signal, the switch 102 opens and the switch 104 closes. Thus, a LOW signal is output to the inductor 112 due to ground 110. Rapidly switching between the voltage source 106 and ground 110 results in a pulse signal being provided to the inductor 112. The inductor 112 and capacitor 116 function as a filter for the switch-mode power supply, as is well-known to those of ordinary skill in the art. The output voltage signal $V_{OUT}$ is provided at node 114. The $V_{OUT}$ signal is a DC signal that contains a degree of ripple. Any suitable circuit or connection may be made at the node 114 to use the output voltage $V_{OUT}$ as desired—for example, as a rail supply.

The voltage and frequency feedback loop 119 receives a feedback voltage signal. In some embodiments, such as those depicted in FIG. 1, the feedback voltage signal received by the loop 119 may be identical to the output voltage signal $V_{OUT}$. In other embodiments, the feedback voltage signal may be obtained from a portion of the power supply other than the node 114, and in still other embodiments, different portions of the feedback voltage signal (e.g., alternating current and direct current portions) may be obtained from different portions of the power supply. In at least some of the embodiments in which some or all of the feedback voltage signal is obtained from a node other than node 114, the ripple in that signal is preferably similar or identical to the ripple in $V_{OUT}$.

The voltage divider, which includes impedances 120, 122, primarily receives the DC component of the feedback voltage signal, although it may include some degree of ripple. In at least some embodiments, the amplifier 126 receives only the AC component of the feedback voltage signal. As explained, in some embodiments, the amplifier 126 receives a signal including a ripple similar or identical to that in the output voltage signal $V_{OUT}$, but from a location in the power supply other than the node 114. The specific parameters for the impedances 120, 122 and for the amplifier 126 may be selected to apply the desired gain to the signals that they receive. The gain applied by the impedances 120, 122 is fixed because the impedance values for impedances 120, 22 are fixed. The amplifier 126, however, applies a variable gain to the AC signal that it receives. More specifically, the specific gain that the amplifier 126 applies to the AC signal depends on the error signal 134 received from the detector 130. The detector 130 compares a target frequency received from the target frequency signal generator 132 to an actual power supply switching frequency detected at the output of the hysteretic comparator 144. The error signal 134 output by the detector 130 reflects a difference between the target and actual switching frequencies. If the error signal 134 indicates that the actual switching frequency is faster than the desired switching frequency, the amplifier 126 dynamically reduces the gain applied to the AC signal, thus reducing the amplitude of the AC signal. Conversely, if the error signal 134 indicates that the actual switching frequency is slower than the desired switching frequency, the amplifier 126 dynamically increases the gain applied to the AC signal, thus increasing the amplitude of the AC signal. The impact that an increase or decrease in the AC signal amplitude has on the actual switching frequency of the switch-mode power supply 100 is described below with respect to the hysteretic comparator 144.

The output of the amplifier 126 is combined with the output of the voltage divider at the summing amplifier 128. The output of the summing amplifier 128 is the voltage feedback signal $V_{FB}$ 136, which is provided to the inverting input 140 of the hysteretic comparator 144. The hysteretic comparator 144 is preferably provided with a fixed hysteresis. The hysteresis may be set in accordance with the parameters of the remaining components in the system 100—for example, the gain of the amplifier 126. The output of the hysteretic comparator 144 changes state when the upper hysteresis trip point is triggered while the voltage feedback signal $V_{FB}$ 136 is rising, and it also changes state when the lower hysteresis trip point is triggered while the voltage feedback signal $V_{FB}$ 136 is falling. When the amplifier 126 increases its gain and thus increases the ripple amplitude of $V_{FB}$ 136, the hysteresis trip points are triggered more often. Thus, the output state of the hysteretic comparator 144 changes more frequently, resulting in a raised switching frequency for the switch-mode power supply. Conversely, when the amplifier 126 decreases its gain and thus decreases the ripple amplitude of $V_{FB}$ 136, the hysteresis trip points are triggered less often. Thus, the output state of the hysteretic comparator 144 changes less frequently, resulting in a lowered switching frequency for the switch-mode power supply. The amplifier 126 continues to adjust its gain, thus increasing or decreasing the switching frequency of the switch-mode power supply 100, until the error signal 134 indicates that the actual switching frequency matches the target switching frequency produced by the target switching frequency generator 132. In this way, the system maintains the power supply switching frequency at the target frequency despite fluctuations in ripple amplitude caused by, e.g., an unstable input voltage 106.

Figure 2:
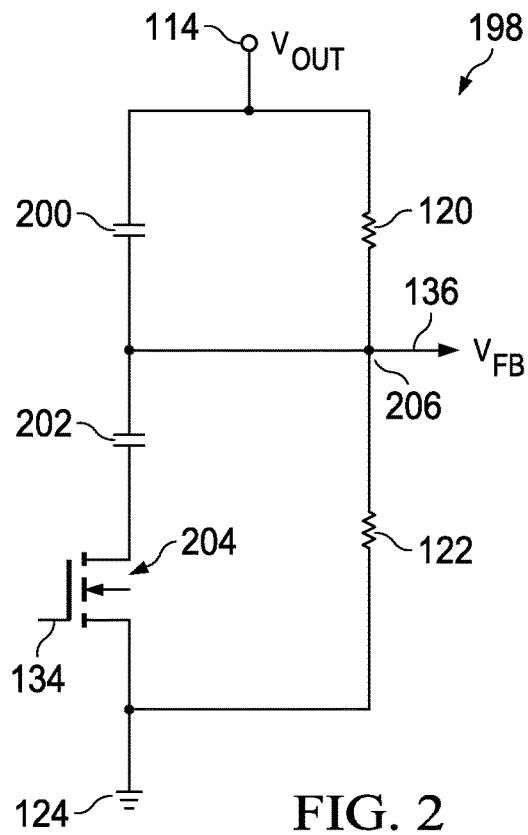
FIG. 2 is a circuit schematic diagram of an illustrative high-pass filter usable in the switch-mode power supply of FIG. 1.

FIG. 2 is a circuit schematic diagram of an illustrative high-pass filter 198 usable as the amplifier 126 of FIG. 1. Although FIG. 2 shows a high-pass filter, the scope of disclosure is not limited to any particular type of amplifier 126. In some embodiments, for example, the amplifier 126 may be any suitable type of active filter. In some embodiments, the amplifier 126 may be any suitable type of high-pass filter. In some embodiments, the amplifier 126 may be any suitable type of band-pass filter. In some embodiments, the amplifier 126 may include a frequency filter in combination with a traditional amplifier, such as an operational amplifier. In some embodiments, the amplifier 126 has a maximum gain of unity. Any and all other suitable types of filters and/or amplifiers that are capable of applying a variable gain may be used as the amplifier 126.

The high-pass filter 198 includes capacitors 200, 202 coupled to impedances 120, 122 as shown. Capacitor 200 and impedance 120 both couple to node 114, at which $V_{OUT}$ is produced. Capacitor 202 couples to a transistor 204 (e.g., an n-channel MOSFET), the gate of which is controlled by the error signal 134. The transistor 204 and the impedance 122 couple to ground 124. The node 206 between the impedances 120, 122 produces the signal $V_{FB}$ 136. The parameters of the capacitors 200, 202 and impedances 120, 122 may be selected as desired by one of ordinary skill, depending on the particular application and power supply behavior desired. A summing amplifier is not specifically shown in the embodiments of FIG. 2, but one may be included as desired. The increase or decrease of the error signal 134 alters the impedance of the transistor 204. This, in turn, causes a shift in the frequency response of the filter 198. The relationship between the error signal 134 and the frequency response of the filter 198 is now described with respect to FIG. 3.

Figure 3:
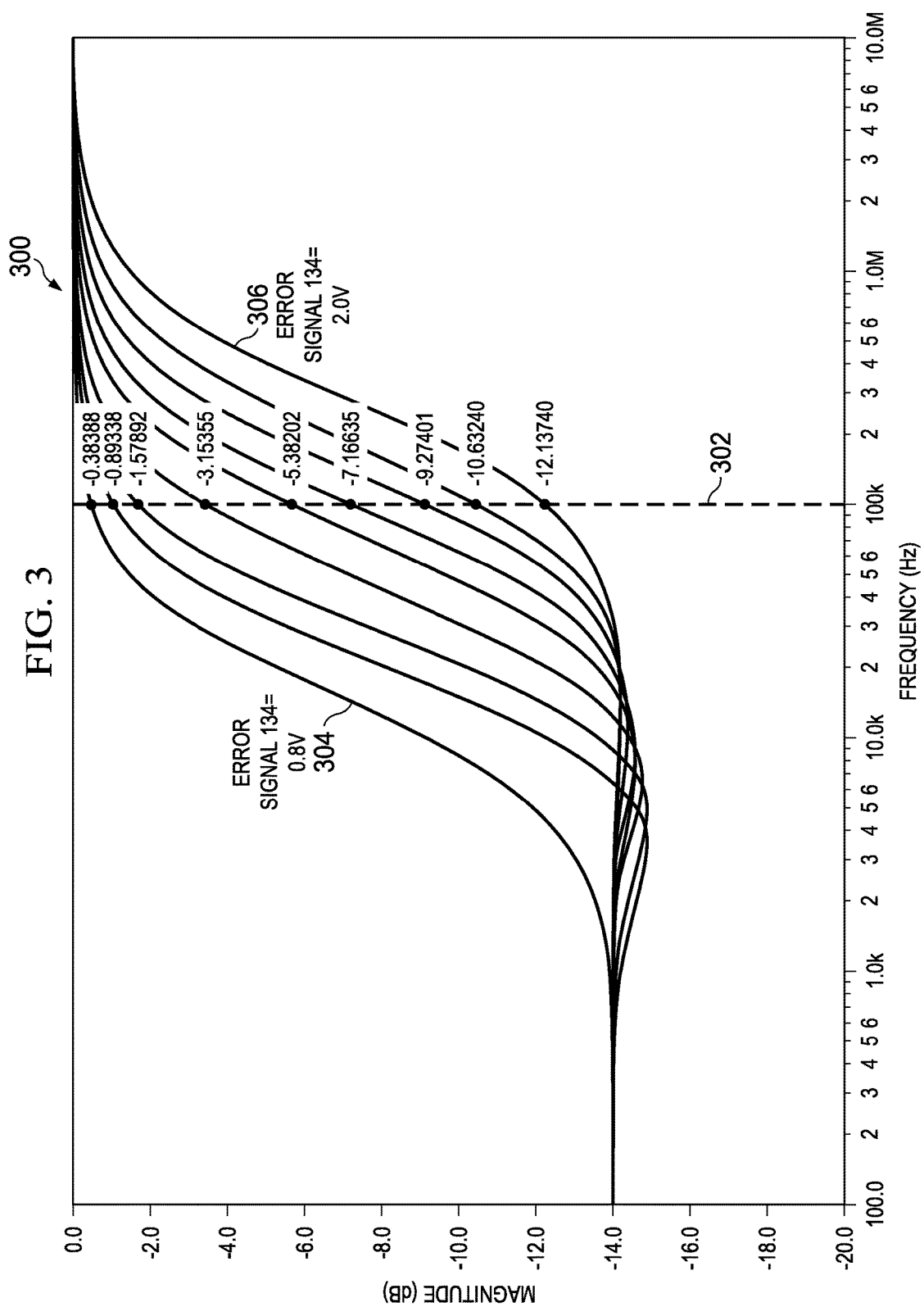
FIG. 3 is a bode plot demonstrating the effect of at least some techniques described herein on ripple amplitude.

FIG. 3 is a bode plot 300 of the high pass filter 198 in FIG. 2 to demonstrate how gain at a specified frequency is adjusted by shifting the frequency response of the filter 198. The plot 300 includes target frequency on the x-axis and ripple magnitude on the y-axis. The plot 300 includes numerous curves, the behaviors of which are best explained by examining the curves at an illustrative frequency of 100 kHz (marked by numeral 302). At 100 kHz, the illustrative curves 304, 306 demonstrate that as the error signal 134 decreases (i.e., from 2.0 V for curve 306 to 0.8 V for curve 304), the pole shifts to a lower frequency, which causes the gain at 100 kHz to increase. This causes a greater ripple amplitude on $V_{FB}$ 136 (FIG. 1), resulting in an increased power supply switching frequency. Conversely, increasing the error signal 134 (i.e., from 0.8 V for curve 304 to 2.0 V for curve 306) shifts the frequency response to the right and thus slows the power supply switching frequency due to a smaller ripple amplitude.

Figure 4:
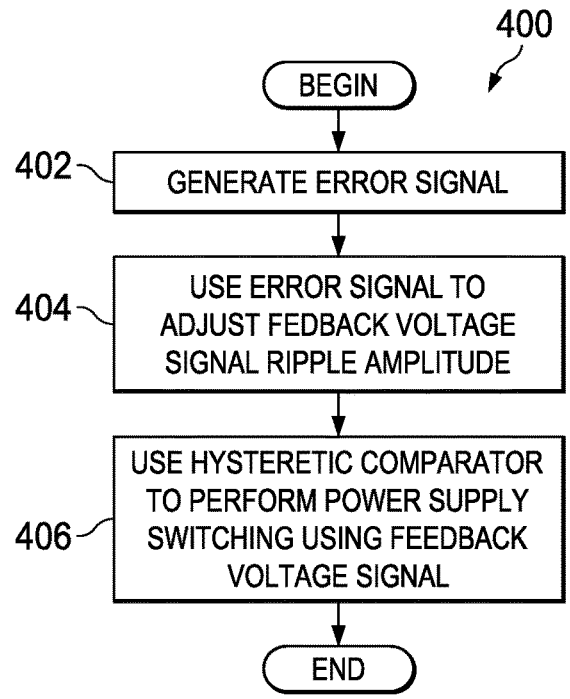
FIG. 4 is a flow diagram of an illustrative method usable to perform at least some of the techniques disclosed herein.

FIG. 4 is a flow diagram of an illustrative method 400 usable to perform at least some of the techniques disclosed herein. The method 400 is described with simultaneous reference to FIGS. 1 and 4. The method 400 begins by generating an error signal 134 (step 402). The error signal 134 is generated by comparing the target frequency produced by generator 132 to the actual power supply switching frequency as determined using the output of the hysteretic comparator 144. The method 400 then comprises using the error signal 134 to adjust the ripple amplitude of the feedback voltage signal (step 404). This is accomplished by providing the error signal 134 to the amplifier 126, which uses the error signal 134 to tune its gain until the error signal 134 diminishes to zero or reaches as close to zero as possible. In at least some embodiments, a high-pass filter such as that shown in FIG. 2 is used, and in such embodiments the error signal 134 may be applied to a gate of a transistor coupled within the filter, as described above. The method 400 continues by using the hysteretic comparator 144 to perform power supply switching using the signal $V_{FB}$ 136 (step 406). Specifically, the hysteretic comparator 144 has a fixed hysteresis, and the frequency with which the ripple of $V_{FB}$ 136 (the amplitude of which is continually adjusted by the amplifier 126 to resolve the error signal 134) triggers the trip points of the hysteresis band dictates the power supply switching frequency. The method 400 may be modified in any suitable manner, including the addition, deletion, modification and/or rearrangement of one or more of the steps.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A method, comprising:
   receiving a feedback voltage signal generated by a switch-mode power supply;
   generating an error signal based on a difference between a switching frequency of the switch-mode power supply and a target frequency; and
   using the error signal to adjust a ripple amplitude of the feedback voltage signal to control said switching frequency in the switch-mode power supply.

2. The method of claim 1, wherein the switch-mode power supply comprises a direct current (DC)-DC converter selected from the group consisting of a buck converter, a boost converter, a buck-boost converter, an inverting converter, a flyback converter and a single-ended primary-inductor converter (SEPIC).

3. The method of claim 1, wherein adjusting said ripple amplitude comprises providing the error signal to an active filter.

4. The method of claim 3, further comprising using the active filter to maintain said ripple amplitude.

5. The method of claim 4, wherein the active filter is a high-pass filter or a band-pass filter.

6. The method of claim 4, wherein the active filter includes multiple capacitors and a transistor in series with one of said multiple capacitors.

7. The method of claim 1, wherein controlling said switching frequency comprises providing the feedback voltage signal to a hysteretic comparator.

8. The method of claim 7, further comprising maintaining a fixed hysteresis in the hysteretic comparator.

9. A system, comprising:
   an amplifier that receives a feedback voltage signal generated by a switch-mode power supply;
   a frequency detector, coupled to the amplifier, to produce an error signal based on a comparison of a switching frequency of the switch-mode power supply and a target frequency; and
   a hysteretic comparator, coupled to the amplifier, to control said switching frequency,
   wherein the amplifier uses the error signal to adjust an amplitude of a ripple in the feedback voltage signal, and
   wherein the hysteretic comparator controls said switching frequency using the feedback voltage signal.

10. The system of claim 9, wherein the hysteretic comparator receives the feedback voltage signal from the amplifier.

11. The system of claim 9, wherein the amplifier is an active filter that comprises a high-pass filter or a band-pass filter.

12. The system of claim 9, wherein the amplifier uses the error signal to maintain said amplitude of the ripple.

13. A system, comprising:
   a direct current (DC)-DC converter that produces an output voltage signal having a ripple and a feedback voltage signal having said ripple;
   a frequency detector, coupled to the converter, that compares a switching frequency of the converter to a target frequency and produces an error signal based on said comparison;
   an amplifier, coupled to the converter and the frequency detector, that adjusts an amplitude of said ripple in the feedback voltage signal based on the error signal; and
   a hysteretic comparator, coupled to the amplifier, that controls the switching frequency of the converter using said feedback voltage signal.

14. The system of claim 13, wherein the hysteretic comparator receives the feedback voltage signal from an output of the amplifier.

15. The system of claim 13, wherein the amplifier comprises an active filter that is either a high pass filter or a band-pass filter.

16. The system of claim 13, wherein the converter is a buck converter, a boost converter, a buck-boost converter, an inverting converter, a flyback converter, or a single-ended primary-inductor converter (SEPIC).

17. The system of claim 13, wherein the hysteretic comparator uses a fixed hysteresis.

18. The system of claim 13, wherein the frequency detector comprises a phase-locked loop (PLL).

19. The system of claim 13, further comprising a voltage divider coupled to the amplifier, wherein a portion of the feedback voltage signal passing through the voltage divider has a DC component and an alternating current (AC) component, and wherein another portion of the feedback voltage signal passing through the amplifier has only an AC component.

20. The system of claim 13, wherein the amplifier obtains said feedback voltage signal from a portion of the DC-DC converter other than a node at which the output voltage signal is produced.

* * * * *